United States Patent [19]

Maruyama

[11] 4,009,961
[45] Mar. 1, 1977

[54] CONTOUR LINE PLOTTING DEVICES
[75] Inventor: Takashi Maruyama, Kawasaki, Japan
[73] Assignee: Nippon Kogaku K.K., Tokyo, Japan
[22] Filed: Mar. 11, 1976
[21] Appl. No.: 665,816

Related U.S. Application Data
[63] Continuation-in-part of Ser. No. 502,949, Sept. 4, 1974, abandoned.

[52] U.S. Cl. .................................................. 356/2
[51] Int. Cl.² ...................................... G01C 11/12
[58] Field of Search ..................................... 356/2
[56] References Cited
FOREIGN PATENTS OR APPLICATIONS
651,958   11/1962   Canada .................................. 356/2

Primary Examiner—Edward S. Bauer
Assistant Examiner—F. L. Evans
Attorney, Agent, or Firm—Shapiro and Shapiro

[57] ABSTRACT

A device for deriving the contour lines for an object from stereophotographic films taken through photographic lenses comprises steroscopic viewing apparatus for comparing the films to locate the different points on the object having a selected height and for producing first position signals representing the positions of the different points in one of the films, and a correction mechanism responsive to the first position signals for producing second position signals which represent corrected positions of the points for defining a contour line corresponding to the selected height.

7 Claims, 11 Drawing Figures

FIG. 3
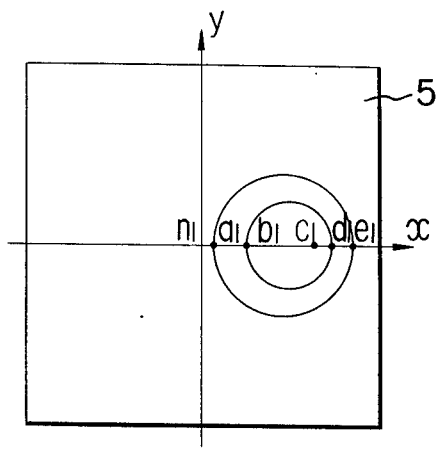
FIG. 4(a)
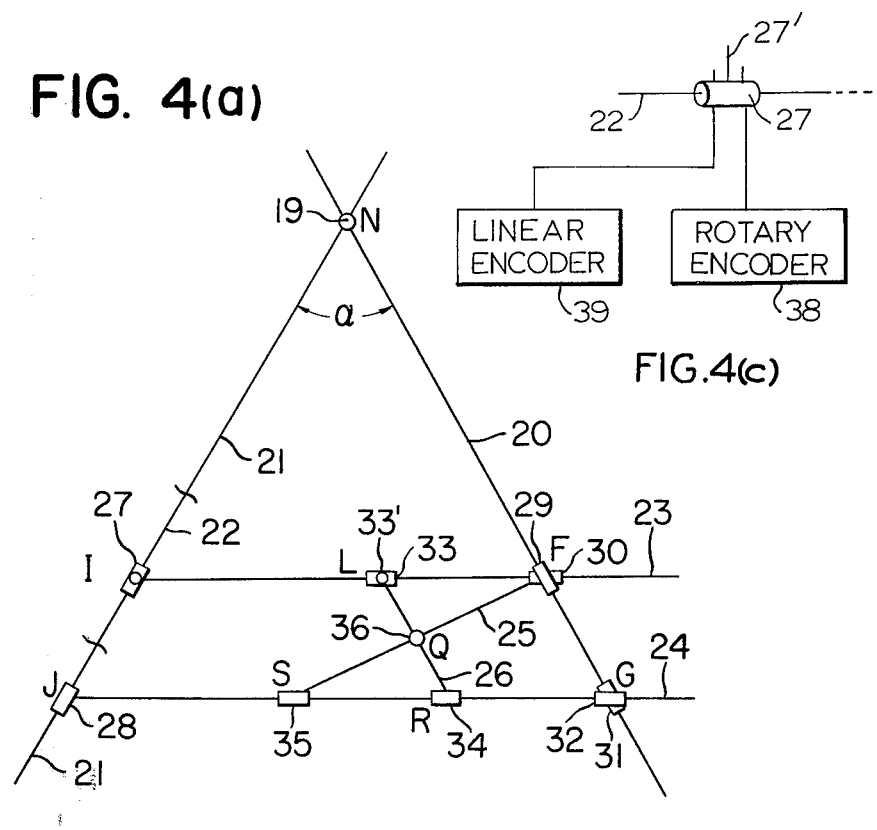
FIG. 4(c)
FIG. 4(b)
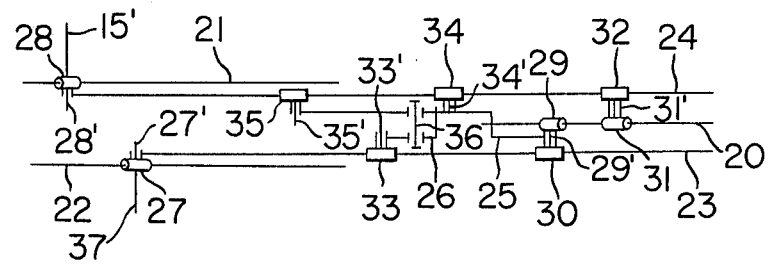

CONTOUR LINE PLOTTING DEVICES

This is a continuation of application Ser. No. 502,949, filed Sept. 4, 1974, now abandoned.

BACKGROUND OF THE INVENTION

1. Field of the Invention

This invention relates to contour line plotting devices, and is more particularly directed to a device for deriving the contour lines of an object from a pair of stereophotographic films of the object.

2. Description of the Prior Art

Stereophotography of an object for study is accomplished with relative ease by the use of microscopes, stereo cameras, or other well-known devices. However, accurate analysis of the two stereophotographic films to determine the contour lines of the object has heretofore required the use of complex instruments, such as stereographs and stereocomparators. These instruments are very expensive and occupy considerable space when installed.

Stereoscopes have often been employed to compare the stereophotographic films to locate in the films the different points on the object having a selected height, that is, the points which would lie on the same contour line in a contour map of the object. However, because neither of the films provides an orthogonal plan view perpendicular to the plane of the desired contour lines, a line connecting these points in the films would represent only an approximation of a contour line containing those points. As a result, accurate analysis of the shape of an object by the use of stereoscopes has heretofore been impractical.

SUMMARY OF THE INVENTION

It is, accordingly, an object of the invention to provide an improved device for deriving the contour lines of an object from stereographic records, such as films, of the object.

Another object of the invention is to provide a device of the above-described type which employs stereoscopic viewing apparatus of known construction.

A device constructed in accordance with the invention for deriving the contour lines of an object from stereophotographic records of the object comprises stereoscopic viewing apparatus for comparing the records to determine the location of different points having a selected height and for producing first position signals representing the location of those points in one of the records, and a correction mechanism responsive to the first position signals for generating second position signals representing corrected positions of the different points for defining a contour line corresponding to the selected height. In the preferred embodiment, the correction mechanism modifies the first position signals in accordance with the following equation to produce the second position signals:

$$P' = \left(1 - \frac{\Delta H}{H}\right) P,$$

where $P$ represents the distance between the different points and the principal point of the record, the principal point being the point of intersection of the record with the optical axis of the lens when the record was made; $\Delta H$ represents the selected height of the different points as measured from a reference plane of the object; $H$ represents the distance between the reference plane and the lens through which the stereophotographic records were taken; and $P'$ is the distance between the points defining the contour line and a reference point, this distance being measured in the same direction as distance P. When the stereoscopic viewing apparatus is employed to trace, in one of the stereophotographic records, a line formed of all the points having the same height, a pencil carried by the correction mechanism depicts the corresponding contour line of the object.

BRIEF DESCRIPTION OF THE DRAWINGS

The invention will be further described in conjuction with the accompanying drawings which illustrate preferred and exemplary embodiments, and wherein:

FIG. 3 shows one of the stereophotographic records, with lines representing the points on the object which have the same height;

FIG. 4(a) is a top plan view of a first embodiment of a correction mechanism which may be employed in conjuction with the stereoscopic viewing apparatus of FIG. 1;

FIG. 4(b) is a side elevational view of the correction mechanism of FIG. 4(a);

FIG. 4(c) illustrates, in block form, a linear encoder and a rotary encoder for representing the output signal of the correction mechanism in polar coordinates;

DESCRIPTION OF THE PREFERRED EMBODIMENTS

Figure 1A:
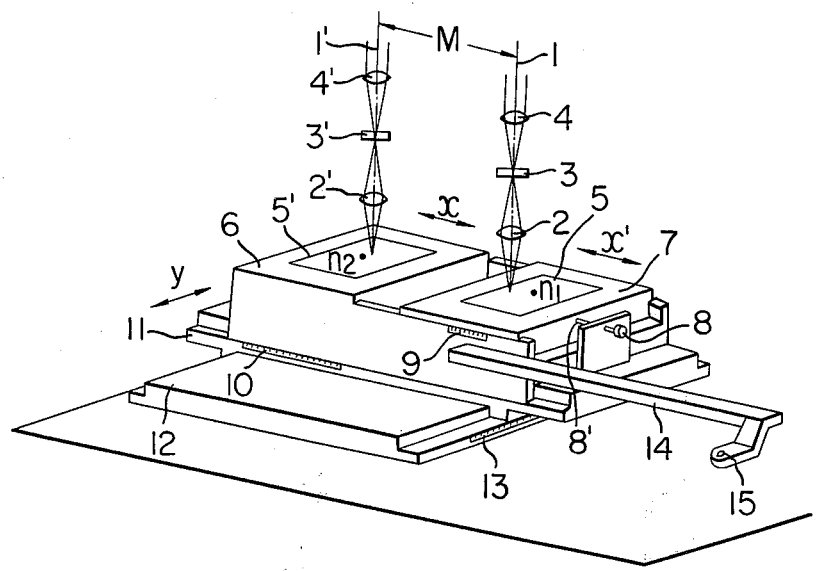
FIG. 1(a) is a perspective view of stereoscopic viewing apparatus employed in the device constructed in accordance with the invention.
Figure 1B:
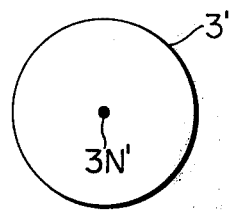
FIGS. 1(b) and 1(c) show reference marks formed at the optical centers of the left and right focusing lenses, respectively, of the stereoscopic viewing apparatus of FIG. 1(a)
Figure 1C:
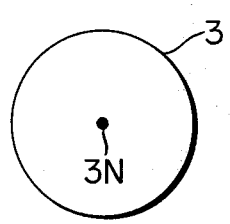

Referring to FIG. 1, a preferred stereoscopic viewing apparatus which may be employed in the contour line plotting device of the invention includes a left-hand optical system 1–4 and a right-hand optical system 1'–4'. Reference numerals 1 and 1' designate the optical axes of the respective optical systems, these axes being parallel and spaced apart by a fixed distance M. Objective lenses 2 and 2' focus the images recorded on the films onto respective focusing lenses 3 and 3', while relay lenses 4 and 4' direct the images on lenses 3 and 3' to the left and right eyes, respectively, of the viewer. Focusing lenses 3 and 3' are provided with reference marks 3N and 3N' on their respective optical axes, as shown in FIGS. 1(b) and 1(c). When the stereophotographic records or films 5 and 5' are viewed through the two optical systems, a stereoscopic image of the object recorded on the films is obtained, as is well known.

Films 5 and 5' are mounted on beds 6 and 7, respectively, by any suitable means (not shown). Bed 7 is supported on bed 6 and is movable in the X' direction relative to bed 6 by means of a knob 8 mounted at the end of a feed screw 8', the amount of relative movement being indicated by a scale 9 and another scale for dial (not shown) on knob 8. Bed 6, together with bed 7, is movable relative to a bed 11 in the X direction (identical to the X' direction), the amount of this relative movement being indicated by a scale 10. Bed 11, together with beds 6 and 7, is movable in the Y direction relative to a bed 12, the amount of this relative movement being indicated by a scale 13. An arm 14 projects in the X direction from bed 6 and has a hole 15 at the end thereof.

In lieu of the scales, photoelectric measurement apparatus, such as a linear encoder, may be employed to provide electrical signals representing the positions of the beds. In this case, the coordinates of the beds 6 and 7, which carry the films, may be calculated by a computer responsive to such signals.

The manner in which the images of the object are formed on stereophotographic films 5 and 5' will now be described with reference to FIG. 2. $O_1$ and $O_2$ are the optical centers of respective photographic lenses (not shown) to which the films are exposed, the length of the base line $O_1O_2$ being designated K. The focal length of each photographic lens is $f$, which is also the distance between the optical centers of the lenses and their respective films. A sample body or object 16, shown as a cone by way of example, rests on a reference plane 17 which is parallel to the plane of the films and which is spaced from the centers $O_1$ and $O_2$ of the lenses by a distance H.

The principal points of the films 5 and 5' are designated $n_1$ and $n_2$, respectively, and are the points of intersection of the optical axes of the photographic lenses with the films. These points may be determined by any of several known methods depending upon the accuracy required. These methods form no part of the present invention and are therefore not described in detail. It is noted, however, that certain instruments, such as stereo cameras, have constructions which enable the locations of the principal points to be easily obtained.

Figure 2:
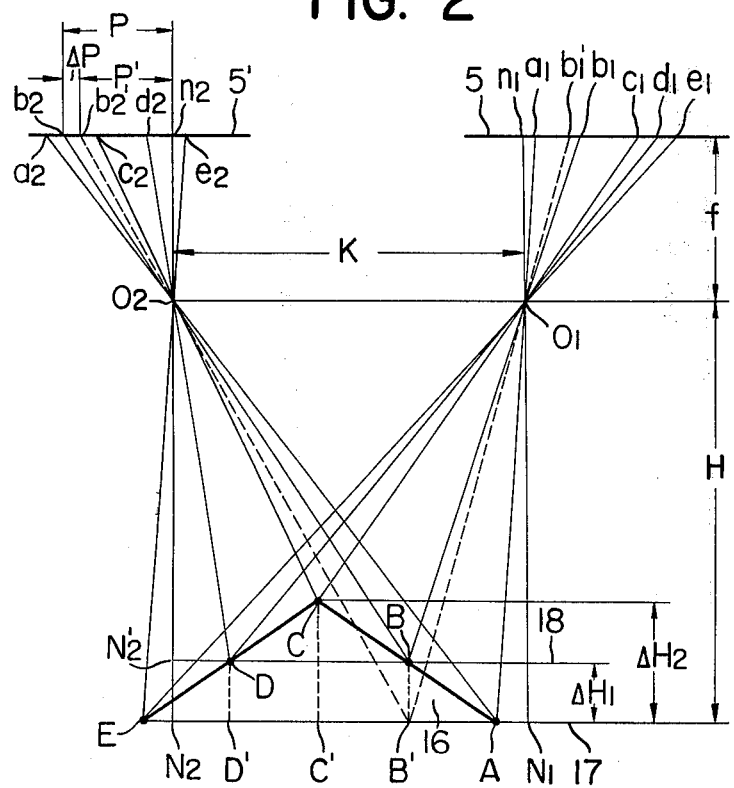
FIG. 2 is a diagram illustrating the manner in which images of the object are formed on the stereophotographic records.

Referring to FIG. 2, points E and A on the outer edge of the cone (and located in the horizontal reference plane 17) are focused onto the right-side film 5 at $e_1$ and $a_1$, respectively, and are focused onto the left-side film 5' at $e_2$ and $a_2$, respectively. Furthermore, when the body 16 is intersected by a horizontal plane 18 which is parallel to plane 17 and which is higher than plane 17 by the distance $\Delta H_1$, the points D and B which lie on the surface of the body in plane 18 are focused onto film 5 at $d_1$ and $b_1$, respectively, and onto 5' at $d_2$ and $b_2$, respectively. Similarly, point C at the apex of the cone, which is higher than plane 17 by the distance $\Delta H_2$, is focused at $c_1$ on film 5 and at $c_2$ on film 5'.

If we refer to the distance between corresponding image points (for example, points $e_1$ and $e_2$) in the two films as the "parallax" of the corresponding point on the object (point E), it can be determined from FIG. 2 that the parallaxes for points E and A, which both lie in the horizontal reference plane 17, are equal (i.e., $\overline{e_1e_2} = \overline{a_1a_2}$). Furthermore, it can be determined that the parallaxes for points D and B, which both lie on horizontal plane 18, are equal to each other (i.e., $\overline{d_1d_2} = \overline{b_1b_2}$), but are greater than the parallaxes for points E and A. Moreover, the parallax for point C is even greater than the parallax for points D and B.

In other words, when corresponding points in the two films are compared, the parallaxes for different points on the object which have the same height, as measured from reference plane 17, have the same parallax. Moreover, this parallax is different from the parallaxes of points having different heights. Thus, the difference between the heights of two points on the object can be represented in terms of the difference between their respective parallaxes (i.e., the "parallax difference"). It will therefore be apparent that information relating to the height of each point on the object is present in the two stereophotographic films, unless, of course, the location of the point is such that the point cannot be focussed onto both the films by the photographic lenses.

In accordance with the relationship between the height of a point and its parallax, the heights of different points on an object can be determined from the stereophotographic films of the object by means of the stereoscopic viewing apparatus of FIG. 1. Moreover, the apparatus may be employed to locate different points on the object which have the same height, thereby enabling the derivation of contour lines in a manner hereinafter described.

With the films 5 and 5' suitably mounted on beds 6 and 7, scales 9, 10, 13 and the scale on knob 8 each indicate 0 when the principal points $n_1$ and $n_2$ of the films are brought into alignment with reference marks 3N and 3N' on their associated focusing lenses 3 and 3' (i.e., $\overline{n_1n_2} = M$). After bed 6 is positioned so that a point of interest on the right-hand film 5' (for example, point $a_2$) is aligned with the reference mark 3N', bed 7 is then moved relative to bed 6 by means of knob 8 and screw shaft 8' until the corresponding point (point $a_1$) on the left-hand film 5 is brought into alignment with the reference mark 3N. The amount of relative movement between beds 6 and 7 is indicated by scale 9 and the scale on knob 8, this movement representing the difference between the parallax for the point (for example, point A) and the distance M. If the measured parallax for another point on the object is greater than M, the point is located above the reference plane 17, whereas if the measured parallax is less than M, the point is located below reference plane 17.

Bed 6, carrying bed 7, is then moved in the X and Y directions to locate other corresponding points in the films which come into simultaneous alignment with the reference marks. In this manner, the different points of the object which have the same height can be traced in the films. The path of this tracing movement is indicated by scales 10 and 13, these scales showing the coordinates of the different traced points, with the principal point $n_2$ of film 5' being the origin. For example, when the beds 6 and 7 are placed to enable the reference marks 3N and 3N' to be aligned with points $a_1$ and $a_2$, respectively, on the films, the beds can be moved together to trace out the outline of the bottom edge of the cone 16 (i.e., all the points which lie on reference plane 17). Moving beds 6 and 7 further apart enables the tracing of points of selectively greater heights, such as the points lying in plane 18.

FIG. 3 illustrates the lines formed by tracing the points which lie in planes 17 and 18 of the object and also illustrates the location of point $c_1$, which corresponds to the apex of the cone. Instead of forming circles which are concentric about point $c_1$, as would be expected if the lines depicted contour lines of the conical body, the lines form circles which are eccentric relative to point $c_1$. This variation between the positions of the traced lines and the expected positions of contour lines representing points having the same height as the traced lines is due to the fact that film 5 is not an orthogonal plan view perpendicular to planes 17 and 18.

Referring to FIG. 2, it will be apparent that these variations are due to two causes. In the first place, the points on the body in plane 18 are closer to the photographic lens (and thus closer to film 5) than are the points in plane 17, and point C is even closer. As a result, whereas the points in plane 17 are focused at the scale of $f/H$, the points in plane 18 are focused at a larger scale of $f/(H - \Delta H_1)$ and point C is focused at the even larger scale of $f/(H - \Delta H_2)$. Secondly, because the optical axis of the photographic lens having center $O_2$ is displaced in the X direction from the axis of rotation of the conical body 16, the points in plane 18 beme laterally shifted a fixed distance in the X direction relative to the points in plane 17. Similarly, point $c_2$ becomes shifted an even greater distance in the same direction relative to the points in plane 17. As shown in FIG. 2, these variations, which are related to the different heights of the points on the object, are also found in the image recorded on film 5'.

However, from FIG. 2, it is readily apparent that these variations in scale and lateral position are not present at the principal points $n_1$ and $n_2$ of the films. Therefore, with the principal point $n_2$ as the reference point, the total variation due to the above-described effects will be calculated with respect to point B, which lies in plane 18.

If a line is drawn from point B perpendicular to reference plane 17 to a point B' on the reference plane, and if it is imagined that the light from point B emanates instead from point B', the light will be focused onto films 5 and 5' at points $b_{1'}$ and $b_{2'}$, respectively, without alteration in scale or lateral position relative to other points in plane 17. In other words, the parallax for point B' is the same as the parallax for points A and E.

If we designate the length of line $\overline{n_2 b_2}$ to be P and the length of line $\overline{n_2 b_2}$ to be P', and if we set $P - P' = \Delta P$, then $$\overline{O_2 n_2 b_2} \sim \overline{O_2 N_2' B} \quad \therefore \quad \frac{f}{H - \Delta H_1} = \frac{P}{N_2' B}$$

$$\overline{O_2 n_2 b_2} \sim \overline{O_2 N_2 B'} \quad \therefore \quad \frac{f}{H} = \frac{P'}{N_2 B'}$$

From $\overline{N_2' B} = \overline{N_2 B'}$, we have $$P - P' = \Delta P = \frac{\Delta H_1}{H} P.$$

Thus, we have the following relationship:

$$P' = \left(1 - \frac{\Delta H}{H}\right) P \quad (1),$$

where $\Delta H$ is a value to be given, the value of H is known, and the Value of P is obtained by a reading of scales 10 and 13 of the stereoscopic viewing apparatus of FIG. 1.

From FIG. 2, it can also be determined that the relationship between the height H of a particular point on the object and the associated parallax difference $\Delta PX$ are related as follows:

$$\Delta PX = \frac{K \cdot f}{H(H - \Delta H)} \cdot \Delta H.$$

Referring to FIG. 3, if the positions of the points forming the traced lines and the point $c_2$ were corrected in accordance with equation (1), the result would be the contour lines of conical body 16 corresponding to the heights of the traced points.

For convenience of description, consideration has been given only to variations which occur in a plane perpendicular to plane 17 and including the base line $O_1 O_2$ (i.e., variations in the X direction). It will, of course, be apparent that errors in the Y direction are calculated in the same manner.

In the contour line plotting device constructed in accordance with the invention, a correction mechanism is employed in conjunction with the stereoscopic viewing apparatus of FIG. 1 for automatically operating on the position signals generated by the stereoscopic viewing apparatus to provide position signals which are corrected for the variations described above. As a result, the correction mechanism provides the contour lines for an object as the points having the same height are traced in the images on the films, as will be apparent hereinafter.

A first embodiment of the correction mechanism, shown in FIGS. 4(a) and 4(b), will now be described. A rotary shaft 19 at the intersection of guide bars 20, 21 and 22 supports the guide bars for rotation therearound. Guide bar 20 forms a predetermined angle $\alpha$ with guide bars 21 and 22, which are parallel to each other. Sliders 29 and 31 are slidable on guide bar 20 and can be immovably fixed by associated clamps (not shown). A guide bar 23 has one end supported for rotation about the shaft 27' of a slider 27 on guide bar 22, guide bar 23 also extending through a slider 30 mounted for rotation about a shaft 29' which extends from slider 29. Likewise, a guide bar 24 has one end supported for rotation about the shaft 28' of a slider 28 on guide bar 21, the guide bar 24 also extending through a slider 32 mounted for rotation about a shaft 31' which extends from slider 31.

A sizing bar 25 has one end mounted for rotation about a shaft 29' on slider 29 and has its other end mounted for rotation about the shaft 35' of a slider 35 on guide bar 24. Another sizing bar 26 has one end mounted for rotation about the shaft 33' of a slider 33 on guide bar 23 and has its other end mounted for rotation about the shaft 34' of a slider 34 on guide bar 24. The sizing bars 25 and 26 are rotatably connected together at their centers by a shaft 36.

There is no eccentricity or play between the guide bars, sizing bars, sliders and rotary shafts. As a result, the geometrical points of intersection between the shafts and the associated bars are as shown in FIG. 4(a).

If sizing bars 25 and 26 are adjusted such that $\overline{LQ} = \overline{RQ}$ and $\overline{SQ} = \overline{FQ}$, guide bars 23 and 24 will remain parallel to each other at all times, independently of the points of intersection I and J of guide bars 23 and 24 with guide bars 21 and 22. Thus, $$\frac{\overline{NI}}{\overline{NJ}} = \frac{\overline{NF}}{\overline{NG}}.$$

Consequently, if the arrangement is set to satisfy the relation that $$\frac{\overline{FG}}{\overline{NG}} = \frac{\Delta H}{H}$$

(this may be done by providing a scale and suitable clamping mechanisms), then $$\frac{\overline{NF}}{\overline{NG}} = \left(1 - \frac{\Delta H}{H}\right) = \frac{P'}{P} = \frac{\overline{NI}}{\overline{NJ}} \quad (2).$$

It will therefore be apparent that the correction mechanism satisfies the requirements of equation (1). Therefore, if N is regarded as a point corresponding to the principal point $n_2$ of film 5', $\overline{NI}$ is equivalent to P' if $\overline{NJ} = P$, $\overline{NJ}$ being the input position signal of the correction mechanism and NI being the output position signal of the mechanism. This will be better understood by referring to the point B in FIG. 2, wherein the points I and J correspond to the points $b_2'$ and $b_2$, respectively. More specifically, by moving slider 28 (point J) to trace a line in film 5' which is formed of points having the same heights, by providing a pencil 37 on the slider 27 (point I), and by making the principal point $n_2$ on film 5 of FIG. 1 to correspond to point N of the correction mechanism, the aforementioned variations in scale and lateral position may be corrected so that the pencil or other indicator or marker is moved in a manner to depict a true contour line of the object.

To select the desired vertical contour line interval, sliders 29 and 31 are positioned to establish the points F and G so as to satisfy equation (2) above, with ΔH representing the desired height of the contour line. The correction in the direction toward the origin is accomplished by sliding the sliders 27 and 28 in the direction toward N and the correction of the rotational direction with respect to the principal point is accomplished by rotation of the crossed guide bars about N.

The contour line plotting device of the invention employing this embodiment of the correction mechanism will now be described. Referring to FIG. 4(b), shaft 15' on slider 28 is inserted into the hole 15 in the arm 14 of the stereoscopic viewing apparatus shown in FIG. 1(a). Because arm 14 is mounted on bed 6, the position of hole 15 provides a signal representative of the position of bed 6. The slider 29 is then moved to the position of slider 31, so that $\overline{FG} = 0$ and $\Delta H = 0$. In this position, the contour line for points on the reference plane 17 can be depicted, no correction being necessary for these points. This is carried out by moving bed 7 in the X and Y directions so that reference marks 3N and 3N' trace points in the films which have the same parallax, that is, the points which lie in the reference plane. After this contour line has been completed, the slider 29 may be moved toward shaft 19 to a position wherein:

$$\frac{\overline{FG}}{\overline{NG}} = \frac{\Delta H_1}{H},$$

so that the contour line for points on plane 18 is depicted. In similar fashion, slider 29 may be moved to other positions wherein $\overline{FG}$ represents different values of ΔH, thus providing different contour lines of the object.

The correction mechanism of the invention permits sliders 27 and 28 to be moved beyond axis 19 (point N) whenever the information on the contour line crosses the principal point $n_2$ of the photograph. Furthermore, if it is desired to depict the contour lines on an enlarged scale, points F and I may be disposed oppositely from the point N with respect to points G and J, respectively. More specifically, point F may be set so as to satisfy the relation that $\overline{NF} = 2(H - \Delta H)$. Of course, apparatus must be provided for maintaining the guide bars 23 and 24 parallel to each other at all times. Thus, point I will be moved to depict a contour line twice as large as the contour line depicted by the apparatus of FIGS. 4(a) and 4(b).

A second embodiment of the correction mechanism will now be described with reference to FIG. 5, parts similar to those of the first embodiment being designated by the same reference characters. In this embodiment, guide bar 26 has one end supported for rotation about the shaft 33' of slider 33 which is secured to guide bar 23, and has its other end extending parallel to guide bar 20 and through a slider 26'. Slider 26' is mounted on the shaft (not shown) of slider 34 and may be immovably fixed by a clamping mechanism (not shown).

The slider 26' is positioned so as to satisfy the relationship that $\overline{FG} = \overline{LR}$, so that guide bars 23 and 24 are maintained parallel at all times. As in the first embodiment, the mechanism is adjusted in accordance with the following relationship:

$$\frac{\overline{FG}}{\overline{NG}} = \frac{\Delta H}{H}.$$

It will therefore be apparent that the length of guide bar 26 must be sufficient to enable $\overline{LR}$ to be made equal to the selected value of $\overline{FG}$.

A third embodiment of the correction mechanism will now be described with reference to FIGS. 6 and 7. Parallel guide bars 103 and 104 intersect the axis of rotation 114 of a bed 120 and are fixedly supported on the bed. A slider 105 is slidable on the guide bar 103. A shaft 106 is secured to the slider 105. A slider 107 is slidable on a guide bar 108, which intersects guide bars 103 and 104 and is supported for rotation about the axis of a shaft 110 mounted on the bed. Slider 107 is rotatably supported on a shaft 105' extending from slider 105. Thus, when slider 105 is moved on guide bar 103, slider 107 is moved thereby on guide bar 108 so that slider 107 is rotated on shaft 105' as guide bar 108 is rotated about shaft 110. A slider 109 is slidable on guide bar 108. A slider 112 is rotatably supported on a shaft 109' extending from slider 109 and is slidable on a guide bar 111 secured to a slider 113 which is slidable on guide bar 104, guide bar 111 being mounted perpendicular to guide bar 104. Because shaft 110 on which guide bar 108 is rotatably supported is mounted on the bed, it will be apparent that the entire correction mechanism is supported for rotation about the axis of rotation 114 of the bed. The line $\overline{NG}$ between axes 110 and 114 is perpendicular to shafts 103 and 104, so that it is always parallel to line $\overline{IF}$ connecting the points of intersection of guide bar 111 with guide bars 104 and 108.

Because guide bar 111 and the line NG are parallel at all times, if the point of intersection of guide bars 103 and 108 is represented by J, it will be apparent that $$\frac{\overline{JI}}{\overline{JN}} = \frac{\overline{IF}}{\overline{NG}}.$$

Figure 6:
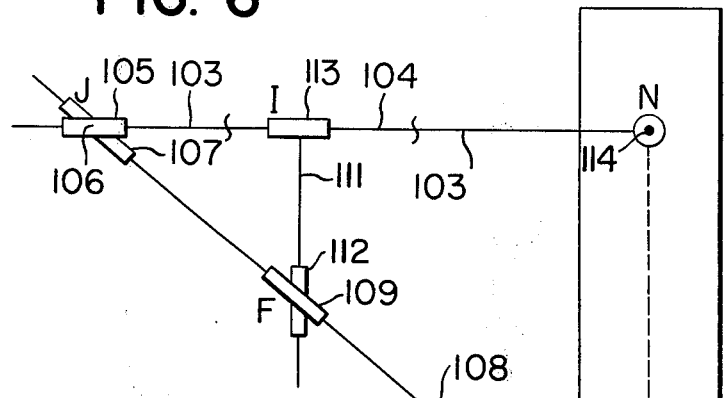
FIG. 6 is a top plan view of a third embodiment of the correction mechanism.
Figure 7:
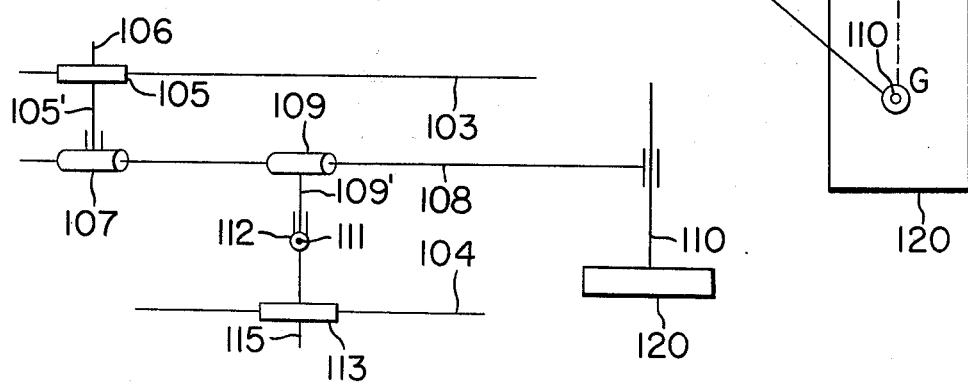
FIG. 7 is a side elevational view of the correction mechanism of FIG. 6.

Thus, the various points N, G, F, J and I in the mechanism of FIG. 6 may be set so that $$\frac{\overline{IF}}{\overline{NG}} = \frac{\Delta H}{H}, \text{ and}$$

$$\frac{\overline{NI}}{\overline{NG}} = \frac{P'}{P}.$$

Figure 5:
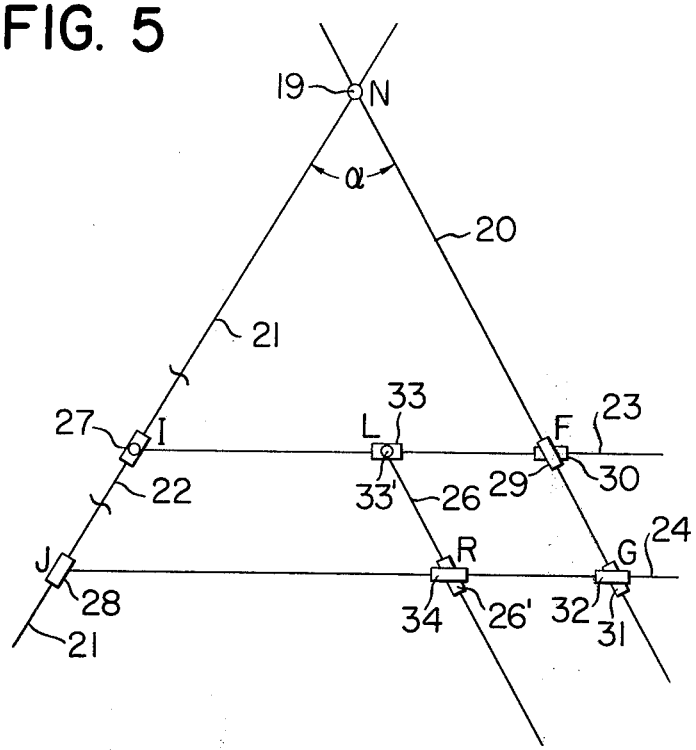
FIG. 5 is a top plan view of a second embodiment of the correction mechanism.

It will therefore be apparent that the correction mechanism of this embodiment can perform the same correction function as the mechanisms shown in FIGS. 4(a), 4(b) and 5.

In any of the above-described embodiments of the correction mechanism, the pencil 37 provided at point I on the output side of the correction mechanism depicts the movement of point I in the form of a contour line. However, instead of actually depicting the contour line, it is also possible to use a rotary encoder 38 and a linear encoder 39 to detect the angle of rotation of point I about point N and to detect the distance between point I and point N so that the movement of point I may be represented in the form of polar coordinates, as shown in FIG. 4(c).

It is believed that the advantages and improved results furnished by the contour line plotting device in accordance with the invention will be apparent from the foregoing description of several preferred embodiments of the invention. Various changes and modifications may be made without departing from the spirit and scope of the invention as sought to be defined in the following claims.

I claim:

1. A device for deriving the contour lines of an object from a pair of stereophotographic records of the object, the device comprising:
   means for comparing the stereophotographic records to locate the points on the object which have a selected height and for generating first position signals representing the positions of the points;
   a correction mechanism rotatably supported about an axis through a point (N) and responsive to the first position signals for generating second position signals which represent corrected positions of the points for defining a contour line corresponding to the selected height, the correction mechanism including means for operating on the first position signals in accordance with the following equation to produce the second position signals:

$$P' = \left(1 - \frac{\Delta H}{H}\right) P,$$

where P is the first position signal and represents the distance between the points and the principal point of the one stereophotographic record, the principal point being the point of intersection of the stereophotographic record with the optical axis of the associated lens through which the record was taken, H represents the distance between the lens and a reference plane of the object when the stereophotographic records were made, $\Delta H$ represents the selected height as measured from the reference plane, and P' is the second position signal and represents the distance between the associated points defining the contour line and a reference point; and
   indicating means for detecting and indicating the second position signal from said correction mechanism.

2. A device as set forth in claim 1, wherein the means for comparing the stereophotographic records and for producing the first position signals comprises:
   record-holding means for supporting the stereophotographic records for movement together in a plane;
   means for moving one of the stereophotographic records relative to the other in accordance with the selected height; and
   a pair of viewing optical systems for viewing respective stereophotographic records, the systems having reference marks on their respective optical axes for aiding location of the different points having the selected height in the one stereophotographic record, the first position signals representing the position of the record-holding means.

3. A device according to claim 2, wherein said indicating means is a means detecting the angle of rotation of the input side of said correction mechanism about said point N and the amount of deviation of said input side from said point N and indicating the position signal (P') of said correction mechanism in the form of polar coordinates.

4. A device as set forth in claim 2, wherein the correction mechanism comprises:
   first and second guide bar means intersecting each other at a predetermined angle and rotatable together about an axis through the point of their intersection;
   third and fourth guide bar means each intersecting the first and second guide bar means and each connected for sliding movement relative to the third and fourth guide bar means; and
   means for maintaining the third and fourth guide bar means parallel to each other at all times, the ratio of the distance between the respective points of intersection of the third and fourth guide bar means with the first guide bar means to the distance between said axis and point of the intersection of the fourth guide bar means with the first guide bar means being adjustable to equal the ratio $\Delta H/H$, the fourth guide bar means being connected to the record-holding means and the indicator means being provided by the third guide bar means.

5. A device as set forth in claim 2, wherein the correction mechanism comprises:
- a bed rotatable about a first axis;
- first guide bar means intersecting the first axis and mounted for rotation with the bed;
- second guide bar means mounted for rotation about a second axis of the bed, the second guide bar means intersecting the first guide bar means;
- coupling means for supporting the second guide bar means for sliding movement relative to the first guide bar means;
- third guide bar means intersecting the first and second guide bar means and being supported for sliding movement relative to the first and second guide bar means; and
- means for maintaining the third guide bar means parallel to a line connecting the first and second axes, the ratio of the distance between the respective points of intersection of the third guide bar means with the first and second guide bar means to the length of the line connecting the first and second axes being adjustable to equal the ratio $\Delta H/H$, the coupling means being connected to the record-holding means and the indicator means being provided by the third guide bar means.

6. A device as set forth in claim 2, wherein the indicator means comprises means for depicting the contour line as the points having the same height are traced in the one stereophotographic record.

7. In apparatus for mapping a contour on an object shown in a photograph of the object taken through an objective located a distance H from a reference plane which defines the contour line as the locus of points a distance $\Delta H$ from the reference plane, wherein the apparatus includes
- means for holding the photograph; and transmission means enabling the contour line on the photograph to be traced for generating a displacement P, where P is the distance of a given point on the line from the principal point on the photograph; the improvement comprising a correction mechanism responsive to the displacement P for generating a displacement P'; where $$P' = \left(1 - \frac{\Delta H}{H}\right) P,$$

whereby the traced contour line is mapped into a curve representing the projection of the line on the reference plane.

* * * * *